United States Patent [19]
Rehmus

[11] 3,900,304
[45] Aug. 19, 1975

[54] METHOD OF REDUCING H₂S EMISSIONS DURING SLAG QUENCHING

[75] Inventor: Frederick H. Rehmus, Baldwin, Pa.

[73] Assignee: Jones & Laughlin Steel Corporation, Pittsburgh, Pa.

[22] Filed: May 7, 1973

[21] Appl. No.: 358,000

[52] U.S. Cl. .......................... 65/19; 75/24; 423/224
[51] Int. Cl. ............................................. C03b 19/08
[58] Field of Search ............ 75/24, .5 C; 65/19, 20; 423/224

[56] References Cited
UNITED STATES PATENTS

| | | | |
|---|---|---|---|
| 1,056,632 | 3/1913 | Croxton | 65/19 |
| 3,758,292 | 9/1973 | Kuntz | 75/24 |
| 3,761,243 | 9/1973 | Kuntz | 75/24 |

OTHER PUBLICATIONS
"Odor Abutment with Potassium Permanganate Solution," Posselt and Reidies, I & EC Product Research and Development, Vol. 4, No. 1, Mar. 1965, pp. 48–50.

Primary Examiner—Robert L. Lindsay, Jr.
Attorney, Agent, or Firm—Gerald K. White; T. A. Zalenski

[57] ABSTRACT

H₂S emissions during slag quenching are significantly minimized by a process involving the pouring of slag into holding pits in incremental layers and time intervals which lead to given slag thermal arrest temperatures. The incrementally poured slag may be air cooled for a 2 to 4 day period or quenched with oxidant containing water to further minimize H₂S emissions.

13 Claims, 9 Drawing Figures

METHOD OF REDUCING H₂S EMISSIONS DURING SLAG QUENCHING

Molten slag from steelmaking operations such as the blast furnace is conventionally treated for ultimate disposal by incremental pouring into pit-like holding containers at temperatures on the order of 2400°F or higher. When a particular pit is filled, the hot slag is quenched with water in order to cause the slag to cool, solidify, and break-up. This procedure permits rapid excavation of the pit. Subsequently, the cooled slag is further treated for use in the construction industry in a variety of applications. During the water quenching operation, H₂S emissions are created by reaction of the water with certain sulfur compounds present in the slag. The primary source of H₂S emissions is believed to be the following reaction:

$$CaS + H_2O \rightarrow H_2S + CaO$$

The above mentioned H₂S emissions are the source of much concern to industry in view of the environmental problems associated with emissions. This application is directed toward a solution which would minimize this problem and thus not contribute to the diminution of environmental conditions.

Moreover, it would be extremely valuable to provide a solution to this problem as various other slag treatment techniques which do not involve equally undesirable alternatives from the standpoint of environmental quality or ecological balance. For example, molten slag could be spread over large areas of ground and allowed to cool without quenching in order to minimize H₂S emissions. However, this procedure would create an environmental problem of its own, i.e., the creation of large and unsightly slag dumps. Considering the enormous quantities of blast furnace slag produced in the world, a severe solid refuse problem would be quickly encountered. On the other hand, slag quenching produces a product which may be recycled into the construction industry rather than being a source of further environmental problems. Thus, it may be seen that a solution to the H₂S emission problem is extremely desirable from the viewpoint of avoiding further environmental problems as well as from the more obvious standpoint of improving air quality.

The invention is partially based upon the discovery that H₂S emissions can be significantly reduced by a technique which involves control of the incremental pouring of molten slag into a pit in such a manner that the combination of incremental slag layer thicknesses and time interval between pours results in a predetermined maximum thermal arrest temperature of the slag prior to quenching. This temperature will be defined more completely in a later portion of this specification.

The invention is also partially based upon the discovery that significant reductions of H₂S emissions upon slag quenching can be attained by the expedient of allowing the slag to cool in air for a predetermined time prior to quenching. This technique also has beneficial results when used in combination with the above described sequential pouring technique.

Finally, it has also been discovered that the incorporation of small amounts of an oxidizing agent into the quench water will further result in a dimiuntion of H₂S emissions when used alone or in combination with either or both of the above described thermal practices.

It is thus an object of my invention to provide a method for reducing the amount of H₂S emissions which occur as a result of slag quenching operations.

It is a further object of my invention to provide a method for reducing H₂S emissions which is based upon thermal practices prior to quenching or upon a combination of thermal practice and use of an oxidizing agent which is incorporated into quenching solution.

It is yet a further objective of my invention to provide a method of H₂S emission control which is flexibly adapted to achieve acceptable emission levels despite various existing operational constraints.

It is an additional object of my invention to improve the air quality of the environment by reducing the level of H₂S emissions which occur upon the water quenching of slag thereby avoiding the necessity of accumulating the slag in solid waste heaps or dumps.

These and other objects and advantages of my invention will be apparent to those skilled in the art from the following description of the invention.

In order to study the effect of the heat transfer phenomenon that occurs during slag pit filling, the following pit filling schedule was followed for a pit having the dimensions of 50 feet wide by 400 feet long and 18 feet deep.

1. At approximately 2½ hour cycles, slag was poured into the pit to form a layer of from 2½ to 3 inches in thickness.
2. Stainless steel sheathed thermocouples were placed at appropriate locations in the pit and readings were recorded on a multipoint recorder.

The above slag pit dimensions and a slag layer of about 2½ inches were used for all tests unless otherwise indicated.

Figure 1:
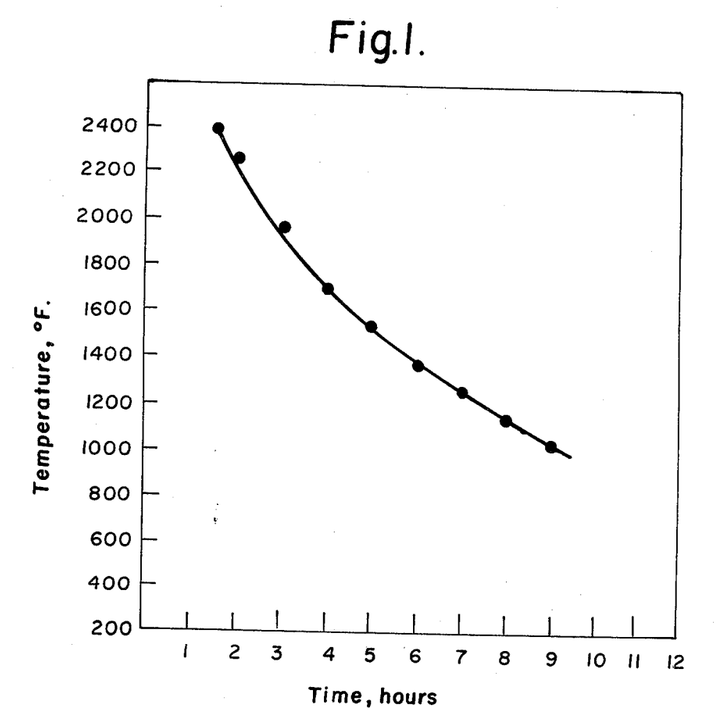
FIG. 1 is a graphical depiction of the typical cooling behavior of a top layer of poured slag which has not been covered by an additional layer, but, instead, has been allowed to cool in the air.
Figure 2:
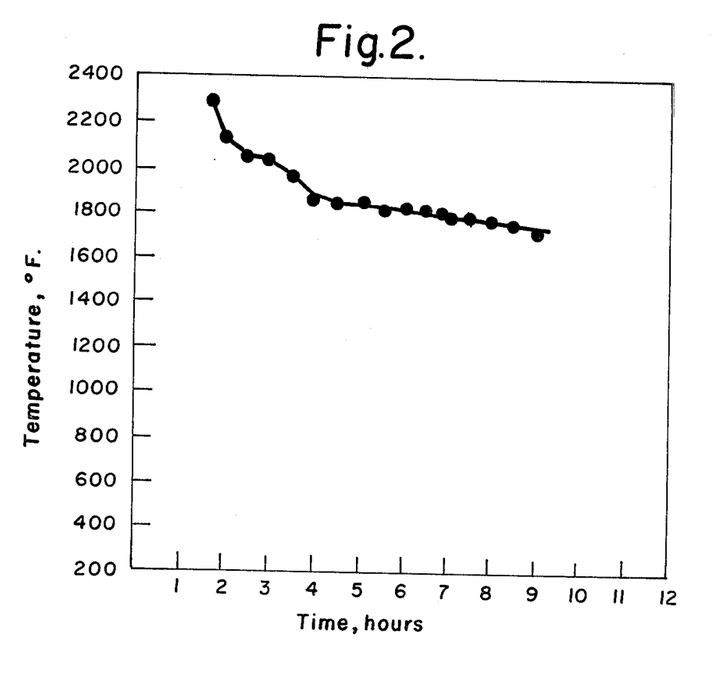
FIG. 2 represents a typical behavior of a "top" layer of poured slag which has been covered by additional slag layers.

The results of this study are depicted in FIGS. 1 and 2. FIG. 1 indicates the temperature history of a top layer immediately after pouring. The effect of pouring cycle time can be estimated from this curve. It is apparent that the top layer will cool fairly rapidly at a generally decreasing rate when new layers are not superimposed upon the top layer.

On the other hand, FIG. 2 illustrates the slag cooling pattern which is obtained upon sequential slag pouring. Here cooling is arrested due to the successive pouring technique. These data are a result of an average pouring cycle time of 2.7 hours. It may be observed that the cooling that would normally occur (as shown in FIG. 1) is stopped or arrested upon the subsequent pour and then remains relatively constant with successive pours. This is due to an insulating effect which is derived from the successive slag pour. Of course, temperatures toward the bottom of the pit will decrease at a slower rate than those toward the top of the pit due to the insulating effect of the slag.

Figure 3:
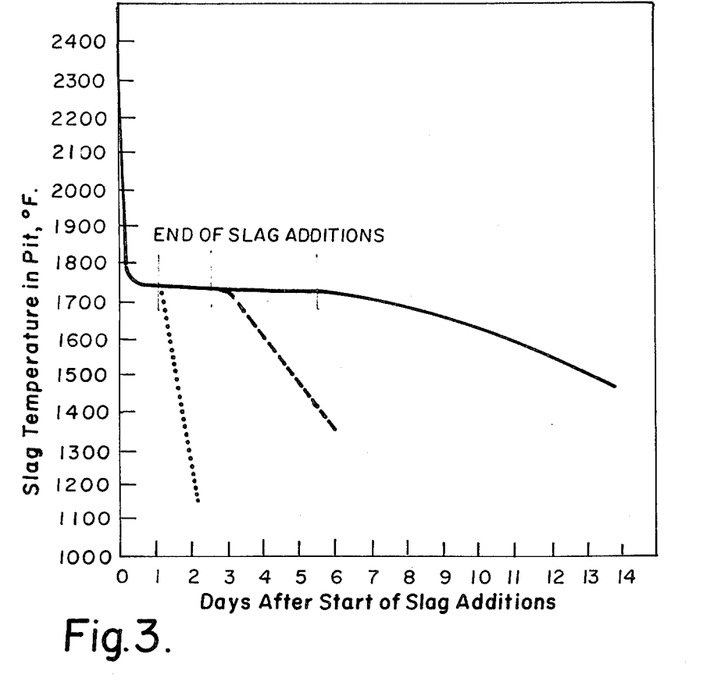
FIG. 3 illustrates the rate of air cooling at different pit depths after the cessation of additional slag pours.

Based upon correlations obtained from actual field measurements, the thermal relationship of FIG. 3 was constructed. The Figure illustrates slag temperatures at various depths in the pit at times the start of slag additions. The three vertical lines represent the end of slag additions for each respective curve. The dotted line represents slog temperature at a depth of 2.3 feet. The rate of cooling due to air cooling would be approximately 26.3°F/hour. A pit depth of 5 feet is depicted by the dashed line. Here an air cooling rate of about 4.9°F/hour would be expected. Finally, the solid line indicates that a cooling rate of about 1.5°F/hour would be attained at a pit depth of 10.5 feet.

As may be noted from the data shown in FIG. 3, there is a marked decrease in cooling rate with increasing slag depth. This data is representative of cooling behavior for a pit 50 feet wide, 400 feet long, and 18 feet in depth in which a 2 to 3 inch slag layer was sequentially poured at 2.7 hour intervals. It should also be noted that the bulk of the slag in the pit is slightly above 1700°F when the slag pit is filled. The substantially horizontal segment of the solid line indicates such temperature. This temperature is defined as the slag thermal arrest temperature and is intended to represent the temperature at position approximately midway of the pit depth upon the cessation of slag pouring. The thermal arrest slag temperature is a function of pit pouring practice, i.e.; it is primarily dependent upon incremental slag layer thickness and the time interval between incremental or successive slag pours. This parameter obviously will vary for a given set of pit dimensions and time intervals.

Figure 4:
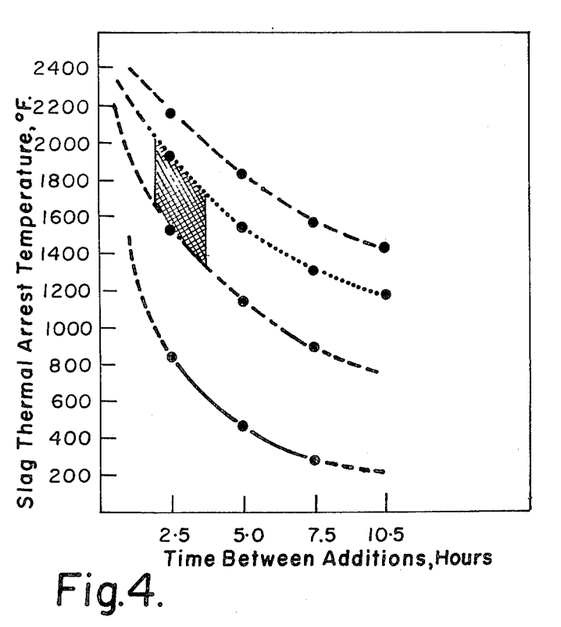
FIG. 4 indicates the effect of time between successive slag pours upon the residual bulk slag temperature for various slag layer thicknesses.

FIG. 4 represents a correlation of slag thermal arrest temperatures with various slag layer thicknesses and time intervals between slag additions. This relationship is based upon trials run in a 50 ft. × 400 ft × 18 ft pit. From top to bottom, the curves represent slag layers of 4 inches, 3 inches; 2 inches, and 1 inch, respectively. As might be expected, smaller incremental slag layer thicknesses lead to generally lower slag thermal arrest temperatures. As might also be expected, increases in time between incremental slag pours also lead to generally lower slag thermal arrest temperatures. The hatched area of the graph is representative of slag thermal arrest temperatures which would occur upon the pouring practice set forth in the preceding paragraph. As would occur to those skilled in the art a somewhat different set of slag thermal arrest temperature relationships would be obtained for pits of dimensions other than that illustrated.

Figure 5:
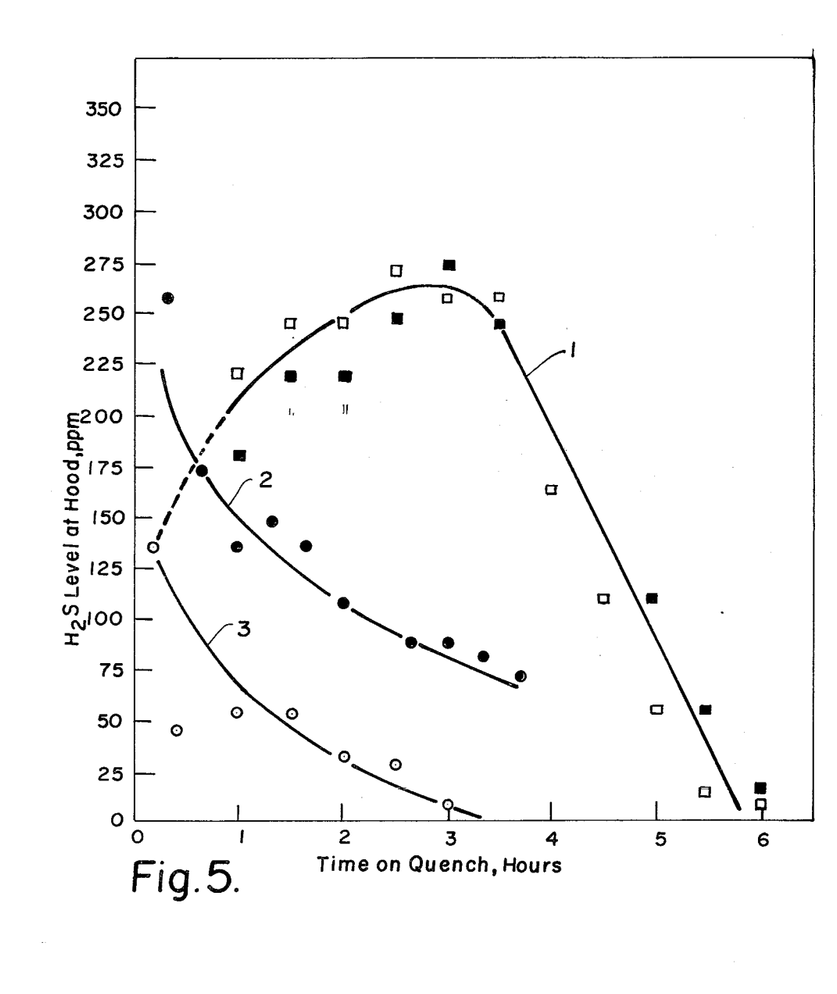
FIG. 5 provides a graphical comparison of the effect of time between successive slag pours upon the incidence of H₂S emissions during the quenching period.

FIG. 5 illustrates the reduction in $H_2S$ emission level as the slag thermal arrest temperature is lowered. All data was obtained from trials which used a 50 ft × 400 ft × 18 ft pit and an average slag layer thickness of about 2½ inches. The slag wat water quenched under an isolating hood immediately upon the completion of sequential pouring. All slag quenching was conducted at a water flow rate of 10 gallons per minute which resulted in a rate per square foot of pit surface of 0.09 gallons per minute/square foot. Curve 1 represents emission data at various quenching time increments. Curve 1 represents incremental slag pouring time intervals of about 2.7 hours. As is evident from the curve, the level of emission increase steeply and then decreased rather sharply. This practice is representative of the attainment of a slag thermal arrest temperature of approximately 1700°F. On the other hand, the use of longer incremental slag pouring intervals, and hence lower thermal arrest slag temperatures (Curves 2 and 3), led to a markedly lower incidence of $H_2S$ emissions. Also of significance is the fact that the peaking effect noted with the 1700°F. curve was eliminated. Curves 2 and 3 represent 5 and 6 hour incremental slag pouring times, respectively, and about 1350°F. and 1250°F. slag thermal arrest temperatures, respectively.

At this point it is appropriate to mention that all $H_2S$ levels depicted in this application were determined by a procedure which was specially designed to be compatible with the production sized pits used in the trials. Sampling of the air around the pit during quenching would be meaningless due to such constantly changing variables such as wind velocity and direction. Thus, an isolating hood was used in the pits to confine all gases in the test area. The hood measured 12 feet in diameter and 7 feet in height. Steam and all gases from the confined area were exhausted to the atmospher through a chimney 1 foot in diameter and 2 feet in height which was located on top of the hood. Gas samples were then collected from the chimney by means of a stainless steel sampling tube. Such samples were then subjected to a chromatographic gas analysis technique suitable for low ppm level monitoring of reactive sulfur compounds such as $H_2S$. This analysis technique is more fully discussed in the following citations: T. M. Todd, "Interference-Free Automatic Air Pollutant Chromatographic Analyzers," American Laboratory, October 1971, page 51 and S. S. Brady et al., J. Gas Chromatog, 4, 42 (1966).

It should be noted that the absolute $H_2S$ levels shown in the figures are much higher than would be encountered at locations near to the pits in actual practice. Air would rapidly dilute such values by a very large factor. However, the reported data are meaningful in the sense that they provide a reproducible value for comparitive purposes.

Figure 6:
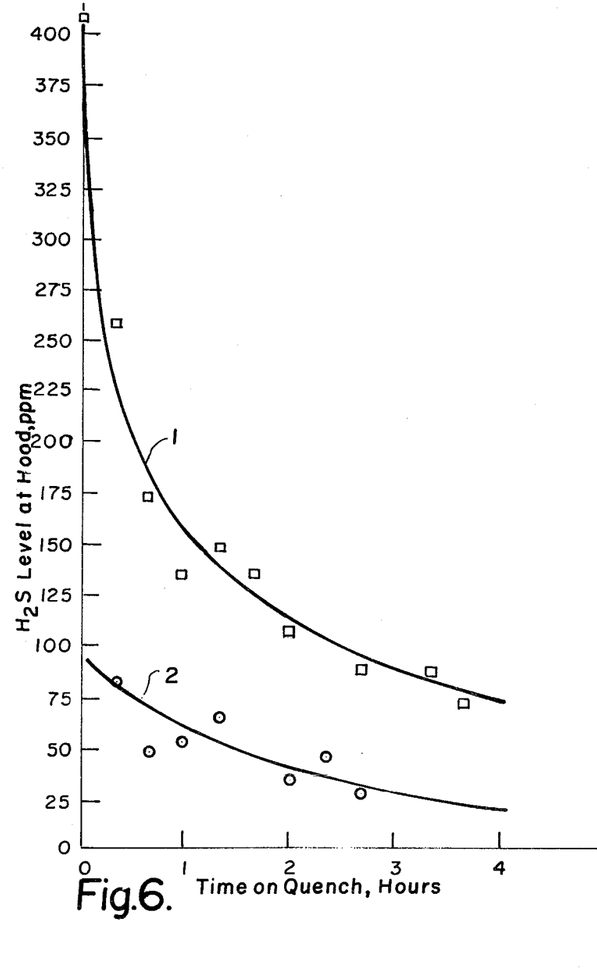
FIG. 6 graphically illustrates the beneficial influence of a 3 day air cooling prior to water quenching when contrasted with immediate quenching.

FIG. 6 also illustrates a variant of slag thermal practice which is beneficial in reducing $H_2S$ emission levels. Curve 1 is representative of the emission pattern obtained during quenching from an approximate slag thermal temperature of 1350°F. Curve 2 represents an emission pattern obtained by air cooling the incrementally poured slag for a 3 day period prior to water quenching. All other variables such as quench rate, pouring sequence interval, slag height, etc. were the same for the respective curves. As clearly indicated by the curves, a period of air cooling prior to water quenching is an effective technique for obtaining a further reduction in emission level.

Figure 7:
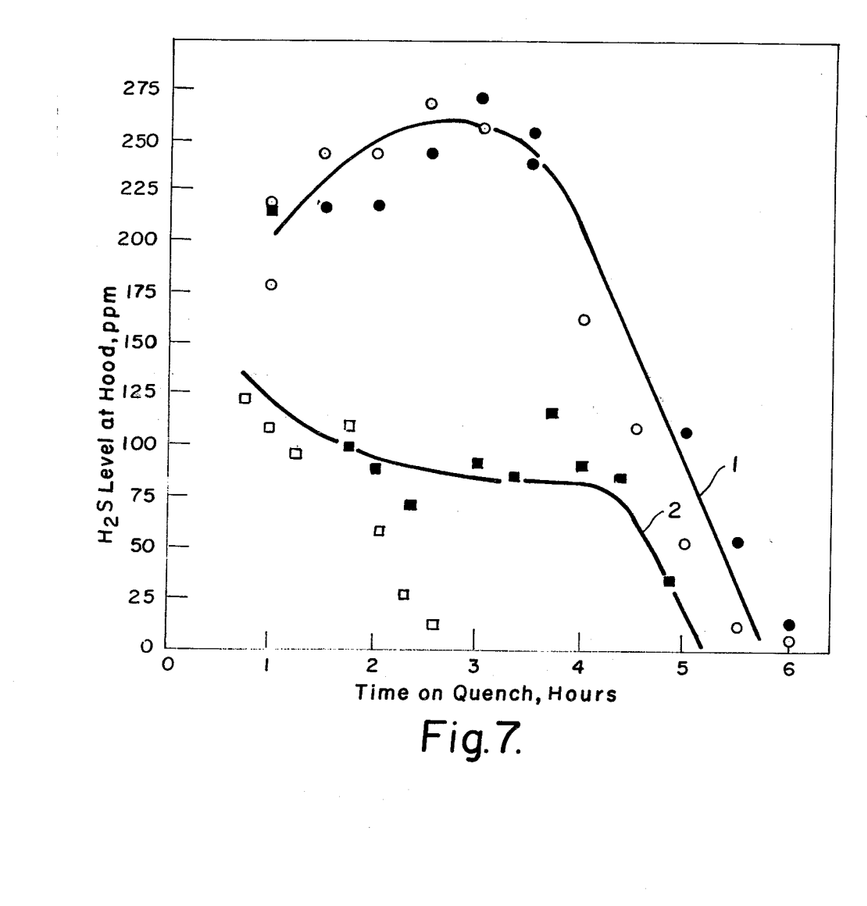
FIG. 7 graphically illustrates the reduction of H₂S emissions that may be attained with the use of an oxidant, such as potassium permanganate, in the quench water.

FIG. 7 illustrates the effect of a 100 ppm. potassium permanganate additions to the quench water. Curve 1 represents about a 1700°F slag thermal arrest temperature practice followed by immediate water quenching. Curve 2 was also developed using the same thermal practice and quenching procedure. The sole difference resided in the potassium permanganate addition to the quench water. As may be observed, the peaking behavior was eliminated and a significantly lower total of $H_2S$ emissions was generated upon quenching. A comparison based upon graphical integration of the area under the respective curves indicated that a 64 percent reduction in the level of emission was attained at the hood.

Figure 8:
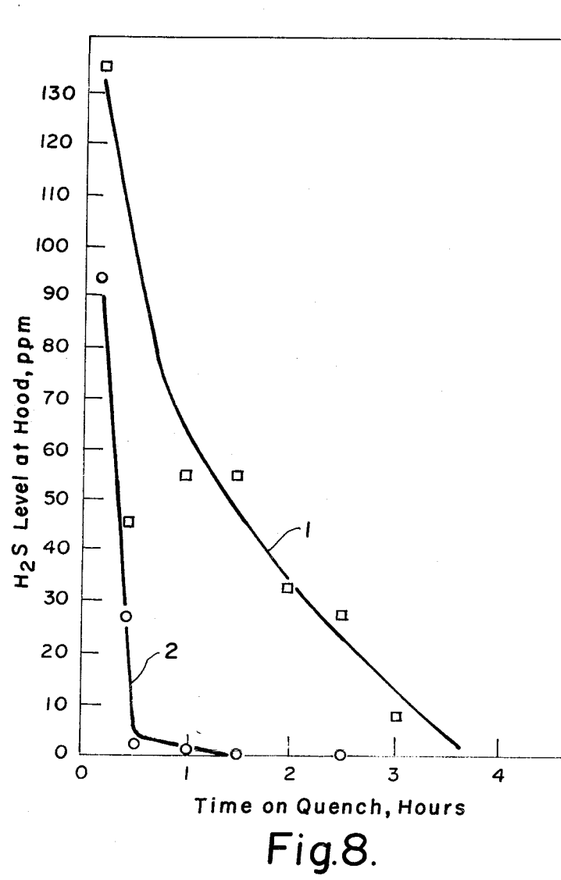
FIG. 8 is a graph which indicates that potassium permanganate additions to the quench water reduce the level of H₂S emissions during quenching when employed in combination with increased time between successive slag pours as contrasted with the use of water alone as the quenchant.

FIG. 8 depicts the improved results obtained when using a 100 ppm potassium permanganate addition in combination with a different thermal practice then that of FIG. 7. In these trials, a slag thermal arrest temperature of about 1250°F. and immediate slag quenching. Curve 1 was with water and Curve 2 was with a potassium permanganate-water solution. This data indicates that potassium permanganate additions to the quench water are effective in inhibiting $H_2S$ emissions at various thermal arrest slag temperatures. A graphical integration comparison indicated that an 84 percent reduction in the $H_2S$ emission level was obtained when measured at the hood.

Figure 9:
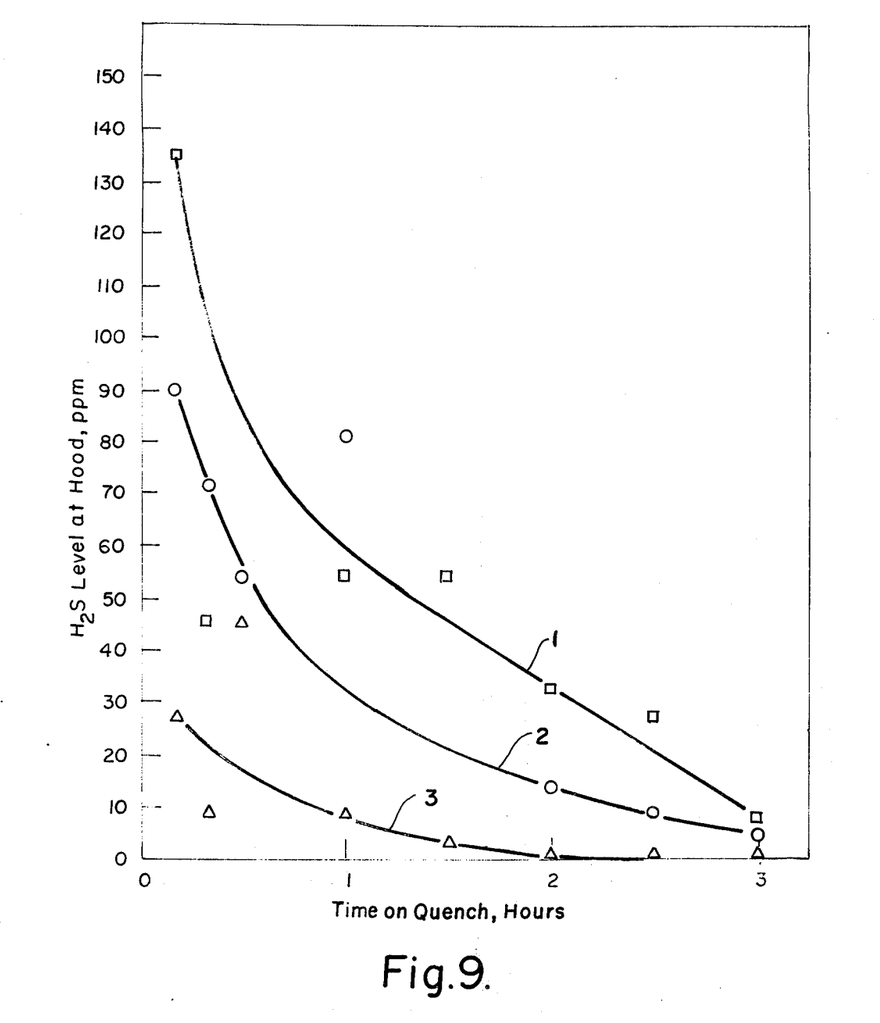
FIG. 9 graphically demonstrates the improvement in H₂S emission reduction which can be attained with air cooling in combination with increased time between successive slag pours and also the improvement obtained with use of potassium permanganate containing quench water in combination with air cooling and increased time between slag pours.

The data represented at FIG. 9 provides a comparison of the use of a 1250°F. slag thermal arrest temperature in combination with immediate quenching (Curve 1), a 3 day air cool prior to quenching (Curve 2), and a three-day air cool prior to quenching and the use of 100 ppm. $KMnO_4$ in the quench water (Curve 3). As may be observed, successively improved results are obtained with the use of increasing combinations of emissions minimization techniques. As contrasted with Curve 1, the 3 day air cooling embodiment resulted in a 45 percent reduction in emission level and the combination 3 day air cooling plus $KMnO_4$ additions led to an 88 percent reduction. Also of interest is the fact that $H_2S$ emissions fell to zero within two hours of quenching time. This factor means that the relatively costly $KMnO_4$ additions could be halted after two hours and the remainder of the quenching period could be conducted with the sole use of water. As a typical quenching period for a slag pit of 50 ft. × 400 ft. × 18 ft. is about eight to ten hours, a significant cost savings would result from this procedure.

The following table presents a summary of the effect of different combinations of thermal and quench practice upon $H_2S$ emission level. A slag thermal arrest temperature of 1700°F. followed by immediate water quenching represents a clearly undesirable emission level from the standpoint of environmental conditions. For this reason, such practice is used as the reference value from which to indicate the various reductions in emission level which may be obtained by use if various improvement combinations. All improvement levels were determined from results of graphical integration of emission pattern curves obtained in the manner previously described in an earlier portion of the specification.

TABLE

| | PRACTICE | | |
|---|---|---|---|
| Thermal Arrest Temperature, °F | Air Cool Before Quench | Addition of 100 ppm. $KMnO_4$ | % Reduction in $H_2S$ Level at the Hood |
| 1700 | No | No | — |
| 1400 | No | No | 35 |
| 1350 | No | No | 55 |
| 1250 | No | No | 86 |
| 1400 | 2 days | No | 55 |
| 1350 | 3 days | No | 85 |
| 1250 | 3 days | No | 93 |
| 1700 | No | Yes | 64 |
| 1400 | 2 days | Yes | 89 |
| 1250 | No | Yes | 98 |
| 1250 | 3 days | Yes | 98.5 |

It is evident from the above Table and the relevant Figures that emission control can be effected through a great variety of combinations and practices. It should also be evident that a specific degree or level of emissions can be obtained through the careful selection and balancing of the previously enumerated thermal and quenching variables. In other words, the means for achieving a desired degree of emission control exists through the expedient of balancing the treatment variables. This aspect is of considerable importance when it is considered that particular plants are faced with specific constraints such as pit capacity, pit dimensions, slag volume, slag pouring temperature, sulfur content of the slag, proximity of plant location to populated areas, etc. Thus, the aspect of potential flexibility which is involved in the selection of specific process parameters is of great importance when the constraints of a particular plant are considered with regard to the utilization of existing equipment or in the design of future installations.

It is also evident that the previously presented data affords a simple and yet accurate method of minimizing $H_2S$ emissions to a desired or preselected level. Such level could be selected by recourse to the type of emission data depicted in the figures or by any other type of $H_2S$ testing. It is then a simple matter to correlate such level with slag thermal arrest temperature data, air cooling practice, and/or quench practice. Such correlation has been previously described in connection with the relevant Figures. Upon selection of the maximum slag thermal arrest temperature which is required to obtain the desired emission level upon subsequent air cooling and oxidant quenching (if the latter two techniques are to be employed), the remaining task is to select an incremental slag layer thickness and time interval between incremental slag pours which will result in the previously determined slag thermal arrest temperature. This may be accomplished in the manner set forth in FIG. 4.

While there are numerous combinations of the overall practice that will result in significantly reduced emission levels, there are several general guidelines that are useful in formulating an approach to the selection of specific embodiments. For example, significant emission reduction is attained at slag thermal arrest temperatures of 1200°F. to 1400°F. without resort to air cooling or the use of an oxidant with the quench water. In the event that such levels would still be considered to be undesirably high for a given installation, it is believed that slag thermal arrest temperatures on the order of 600°F to 800°F could be successfully employed so as to take advantage of the thermal arrest factor without resort to use of the other two minimization techniques.

With regard to air cooling upon the termination of slag pouring and prior to quenching, it is clear that significant reductions in emission level are possible. The choice of the duration of air cooling is generally that period which is compatible with operating constraints. As significant improvements have been attained by utilizing a 2- to 4-day period, such period is generally recommended for use in combination with the other two control techniques. However, any predetermined time period of air cooling prior to quenching is advantageous.

As reflected by the previously presented data, the use of an oxidizing agent mixed with the quench water is an effective tool for the subsequent reduction of $H_2S$ emissions. Suitable oxidizing agents include sodium hypochlorite, lime, sodium hydroxide, potassium permanganate, or admixtures thereof. Sodium hypochlorite, although effective, has potential operational problems because of its explosive potential when stored as a solid and its possible decomposition to toxic chlorine when stored as a liquid. As potassium permanganate ($KMnO_4$) is a strong oxidizing agent, can be stored as a solid, and can be easily prepared as a solution for injection into the quench water, its use is presently preferred in the practice of this aspect of the invention. Although this additive is suitable for use at low ppm concentrations, it is preferred to utilize a range of at least 50 ppm. Typically concentrations of approximately 50 to 200 ppm are suitable to maximize the initial effect of the additive. It is also believed that such concentrations are useful in the sense that $H_2S$ levels can thus be rapidly controlled to approach zero at an early portion of the quenching process. When such levels are approached, the remainder of the quench period can then be followed with the use of only water. This obviously serves to minimize the cost of the oxidizing agent.

Two typical process embodiments which have been found to be highly effective in minimizing $H_2S$ emissions are discussed below. The first embodiment utilizes a 1250°F to 1350°F slag thermal arrest temperature in combination with a 2 to 4 day air cool prior to quenching. Quenching is then conducted with use of a minimum concentration of 50 ppm $KMnO_4$ in the quench water. This embodiment has the capability of reducing emissions approximately 96 percent when contrasted with the undesirable emission level obtained with a procedure which employs a 1700°F slag thermal arrest temperature, no air cooling, and no oxidizing agent addition to the quench water. The second embodiment obtains about an 8 percent improvement through the use of a slag thermal arrest temperature of about 1400°F, a 2-day air cool, and a minimum concentration of 50 ppm $KMnO_4$ in the quench water. This embodiment, although quite effective, is not as effective as the first embodiment due to a slightly higher slag thermal arrest temperature and an air cooling interval which is on the low end of the range. However, the second embodiment would have the advantage that higher volumes of slag could be processed per unit of time.

I claim:

1. A method of minimizing $H_2S$ emissions during slag quenching, comprising:
   a. successively pouring molten slag increments into a holding pit in such incremental slag layer thicknesses and time intervals between said incremental slag pours that a slag thermal arrest temperature of from about 1200°F to about 1400°F is attained; and
   b. quenching said incrementally poured slag with a quenchant which comprises water and an oxidizing agent.

2. A method of minimizing $H_2S$ emissions during slag quenching, comprising:
   a. successively pouring molten slag increments into a holding pit in such incremental slag layer thicknesses and time intervals between said incremental slag pours that a slag thermal arrest temperature of from about 1200°F to about 1400°F is attained;
   b. permitting said incrementally poured slag to cool in air for a time period of about 2 to about 4 days; and
   c. quenching said incrementally poured slag with a quenchant which comprises water.

3. A method of minimizing $H_2S$ emissions during slag quenching as recited in claim 2, wherein said quenchant comprises water and an oxidizing agent.

4. A method of minimizing $H_2S$ emissions during slag quenching as recited in claim 3, wherein said oxidizing agent is selected from the group consisting of sodium hypochlorite, lime, sodium hydroxide, potassium permanganate, and admixtures thereof.

5. A method of minimizing $H_2S$ emissions during slag quenching as recited in claim 4, wherein said oxidizing agent is potassium permanganate.

6. A method of minimizing $H_2S$ emissions during slag quenching as recited in claim 5, wherein said quenchant contains at least about 50 ppm. potassium permanganate.

7. A method of minimizing $H_2S$ emissions during slag quenching as recited in claim 6, wherein said incrementally poured is initially quenched with a quenchant comprising water and potassium permanganate until the $H_2S$ emissions approach very low values and then quenching said incrementally poured slag with a quenchant which only comprises water for the remainder of the quenching step.

8. A method of minimizing $H_2S$ emissions during slag quenching as recited in claim 1, wherein said oxidizing agent is selected from the group consisting of sodium hypochlorite, lime, sodium hydroxide, potassium permanganate, and admixtures thereof.

9. A method of minimizing $H_2S$ emissions during slag quenching as recited in claim 8, wherein said oxidizing agent is potassium permanganate.

10. A method of minimizing H$_2$S emissions during slag quenching as recited in claim 9, wherein said quenchant contains at least about 50 ppm. potassium permanganate.

11. A method of minimizing H$_2$S emissions during slag quenching as recited in claim 10, wherein said incrementally poured is initially quenched with a quenchant comprising water and potassium permanganate until the H$_2$S emissions approach very low values and then quenching said incrementally poured slag with a quenchant which only comprises water for the remainder of the quenching step.

12. A method of minimizing H$_2$S emissions during slag quenching, comprising:
 a. successively pouring molten slag increments into a holding pit in such incremental slag layer thicknesses and time intervals between said incremental slag pours that a slag thermal arrest temperature of from about 1250°F to about 1350°F is attained;
 b. Permitting said incrementally poured slag to cool in air for a time period of from about 2 to about 4 days; and
 c. quenching said incrementally poured slag with a quenchant which comprises water and at least 50 ppm potassium permanganate.

13. A method of minimizing H$_2$S emissions during slag quenching, comprising:
 a. successively pouring molten slag increments into a holding pit in such incremental slag layer thicknesses and time intervals between said incremental slag pours that a slag thermal arrest temperature of about 1400°F is attained;
 b. permitting said incrementally poured slag to cool in air for a time period of about 2 days; and
 c. quenching said incrementally poured slag with a quenchant which comprises water and at least 50 ppm. potassium permanganate.

* * * * *